(12) United States Patent
Samejima et al.

(10) Patent No.: US 6,854,249 B1
(45) Date of Patent: Feb. 15, 2005

(54) LAWN MOWER

(75) Inventors: Kazuo Samejima, Sakai (JP); Yoshikazu Togoshi, Sakai (JP); Masato Asahara, Sakai (JP); Yoshiyuki Esaki, Sakai (JP); Akira Minoura, Sakai (JP); Osami Fujiwara, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 10/796,558

(22) Filed: Mar. 9, 2004

(30) Foreign Application Priority Data

Aug. 18, 2003 (JP) ........................................ 2003-294350

(51) Int. Cl.$^7$ .............................................. A01D 34/70
(52) U.S. Cl. ........................................ 56/13.3; 56/16.6
(58) Field of Search ................................ 56/13.3, 13.4, 56/16.6, 202, 320.1, 320.2

(56) References Cited

U.S. PATENT DOCUMENTS

| | | |
|---|---|---|
| 4,114,353 A | 9/1978 | Ansbaugh et al. |
| 4,711,073 A | 12/1987 | Freier, Jr. et al. |
| 4,996,829 A | 3/1991 | Saitoh et al. |
| 5,224,327 A | 7/1993 | Minoura et al. |

FOREIGN PATENT DOCUMENTS

JP 08-322355 10/1996

*Primary Examiner*—Robert E Pezzuto
(74) *Attorney, Agent, or Firm*—Webb Ziesenheim Logsdon Orkin & Hanson, P.C.

(57) ABSTRACT

A lawn mower comprises a blade drive shaft with a blade rotatably mounted inside a mower deck supported by a vehicle body, a blower unit including a cylindrical blower housing connected to a grass clippings discharging section provided in a side end region of the mower deck, a vertical drive shaft having a shaft portion with vanes attached thereto inside the blower housing and a shaft portion extending upward through the blower housing, and a discharging sleeve projecting rearwardly along an outer tangent line of the blower housing, a grass collecting apparatus mounted rearwardly of the vehicle body, a duct for allowing the discharging sleeve to communicate with the grass collecting apparatus, and a belt-type blower driving mechanism for driving the vertical drive shaft of the blower unit. The belt-type blower driving mechanism includes an intermediate vertical shaft disposed rearwardly of the blower housing, and a belt transmission unit for transmitting power from the blade drive shaft to the vertical drive shaft through the intermediate vertical shaft.

5 Claims, 12 Drawing Sheets

LAWN MOWER

BACKGROUND OF THE INVENTION

1. Field of the Invention

The present invention relates to a lawn mower adapted to collect grass clippings cut by a mower unit in a grass collecting apparatus mounted rearwardly of a vehicle body.

2. Description of the Related Art

A conventional lawn mower of the above-noted type is known from U.S. Pat. No. 5,224,327 and Japanese Patent Application "Kokai" No. 8-322355, for example, which comprises a mower unit including a mower deck having bar blades driven to rotate about vertical axes and a grass clippings discharge outlet formed in a side end of the mower deck, the mower unit being attached to a vehicle body to be vertically movable, a grass collecting apparatus mounted rearwardly of the vehicle body, and a blower unit mounted above the grass clippings discharge outlet of the mower deck to be driven by a vertical shaft and operatively connected to a blade driving line, wherein grass clippings discharged from the grass clippings discharge outlet are forcibly transported to the grass collecting apparatus through the blower unit and a duct.

The conventional lawn mower noted above employs a belt transmission mechanism in which a blade drive shaft of the bar blade positioned closest to the grass clippings discharge outlet is interlocked with a lower end portion of an intermediate vertical shaft by winding a belt thereon while an upper end portion of the intermediate vertical shaft is interlocked with an impeller drive shaft projecting upwardly of a blower housing by winding a belt thereon, thereby to transmit power taken from the blade driving line provided above the mower deck to a blower input portion provided in a higher position. With this arrangement, however, the relay intermediate vertical shaft is mounted forwardly of the blower housing, as a result of which pulleys provided in the upper and lower end portions of the intermediate vertical shaft disadvantageously project to a large extent forwardly of the blower housing.

A blower drive mechanism including the intermediate vertical shaft is incorporated in the blower unit as one unit and attachable to and detachable from the mower deck. As described above, the intermediate vertical shaft is mounted forwardly of the blower unit, which increases a dimension from a front end of the blower drive mechanism to a rear end of a discharging sleeve projecting rearwardly of the blower housing. Consequently, such a blower unit is cumbersome to handle when attached to or removed from the mower deck and requires a large storage space when removed.

SUMMARY OF THE INVENTION

The object of the present invention is to provide a compact arrangement of the blower unit and blower driving mechanism to facilitate handling and storage thereof in order to solve the above-noted problems of the prior art.

In order to fulfill the above object, a lawn mower according to the present invention comprises a mower deck supported by a vehicle body, a blade drive shaft with a blade rotatably mounted inside the mower deck, a grass clippings discharging section provided in a side end region of the mower deck, a blower unit including a cylindrical blower housing connected to the grass clippings discharging section, a vertical drive shaft having a shaft portion with vanes attached thereto inside the blower housing and a shaft portion extending upward through the blower housing, and a discharging sleeve projecting rearwardly along an outer tangent line of the blower housing, a grass collecting apparatus mounted rearwardly of the vehicle body, a duct for allowing the discharging sleeve to communicate with the grass collecting apparatus, a belt-type blade driving mechanism mounted above a top wall of the mower deck for driving the blade drive shaft, and a belt-type blower driving mechanism for driving the vertical drive shaft of the blower unit by utilizing power transmitted from the belt-type blade driving mechanism. The blower driving mechanism includes an intermediate vertical shaft disposed rearwardly of the blower housing, and a belt transmission unit for transmitting power from the blade drive shaft to the vertical drive shaft through the intermediate vertical shaft.

In this arrangement, the intermediate vertical shaft constituting a core element of the blower driving mechanism is disposed in a dead zone defined rearwardly of the blower housing, which prevents the blower driving mechanism from putting any spatial pressure on other elements and reduces the fore-and-aft dimensions of the blower unit per se having the blower driving mechanism integrated therewith, compared with the conventional arrangement. Thus, the blower unit is easily attached to or detached from the mower deck with the benefits of compactness in the fore-and-aft dimensions of the blower unit having the blower driving mechanism integrated therewith, which also reduces the storage space for the removed blower unit.

Further, for providing an optimal arrangement of the intermediate vertical shaft constituting the core element of the blower driving mechanism, it is proposed that the intermediate vertical shaft is mounted in a corner area defined by an outer peripheral wall of the blower housing and the discharging sleeve. With this arrangement, the blower driving mechanism is free from interference with the other elements, while quite a rational arrangement is provided for the blower unit and the blower driving mechanism.

According to one preferred embodiment of the present invention, the belt transmission unit includes belt pulleys mounted on the blade drive shaft and the intermediate vertical shaft, a belt wound around the pulleys, and a tension clutch switchable between a disengaging position for breaking the power transmission ability of the belt and an engaging position for maintaining the power transmission ability of the belt. With this arrangement, in attaching and detaching the blower unit having the blower driving mechanism integrated therewith to/from the mower deck, the belt wound between the blade drive shaft and the intermediate vertical shaft can be maintained in a loose state by maintaining the tension clutch in the disengaging position. Also, when the mower unit is driven idle for cleaning the interior of the mower deck, the tension clutch is switched to the disengaging position, which prevents the blower unit from being driven unnecessarily and allows only the mower unit to be driven.

Other features and advantages of the present invention will be apparent from the following detailed description of the preferred embodiments to be taken with reference to the accompanying drawings.

DESCRIPTION OF THE PREFERRED EMBODIMENT

Figure 1:
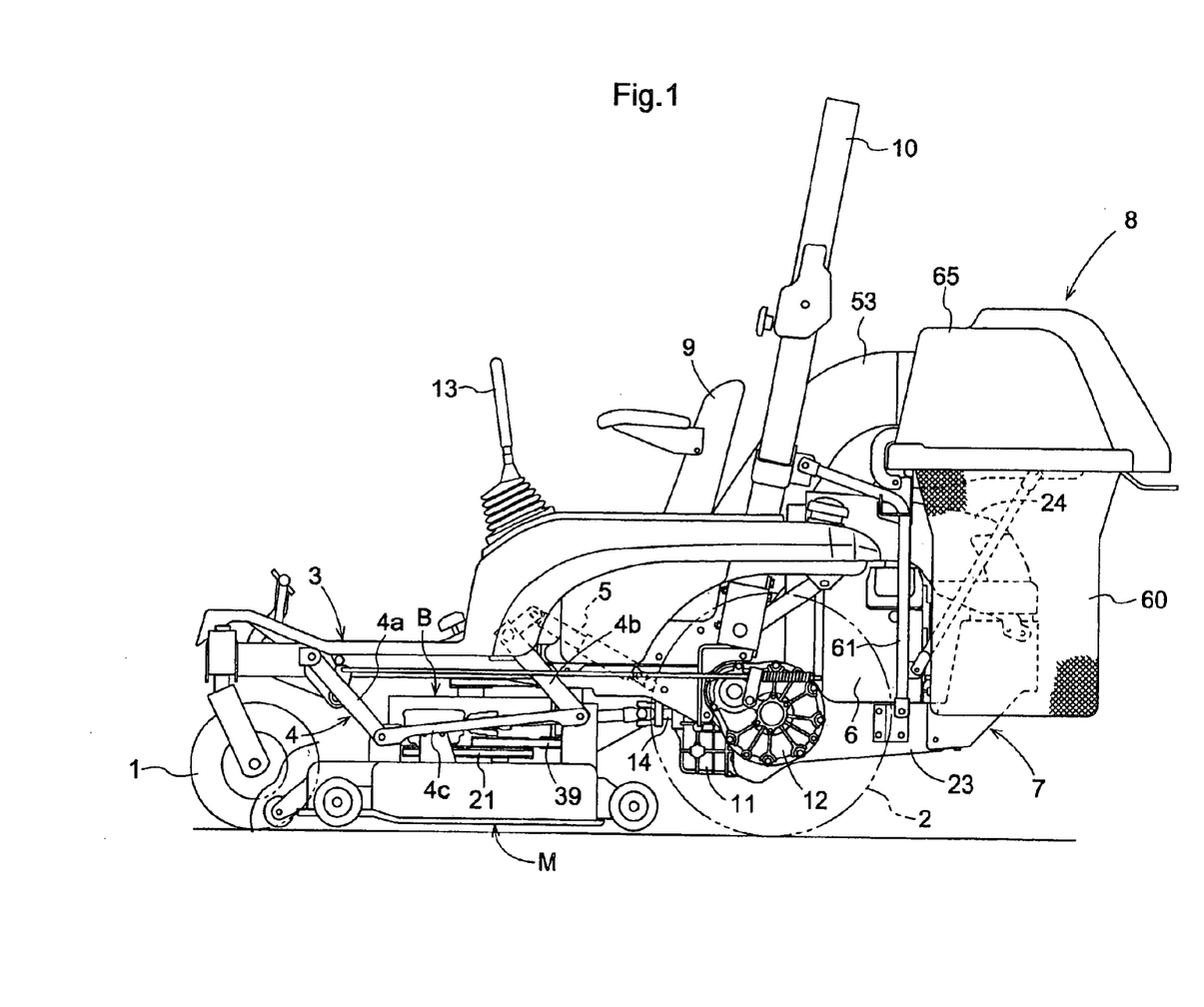
FIG. 1 is a side elevation of a lawn mower.
Figure 2:
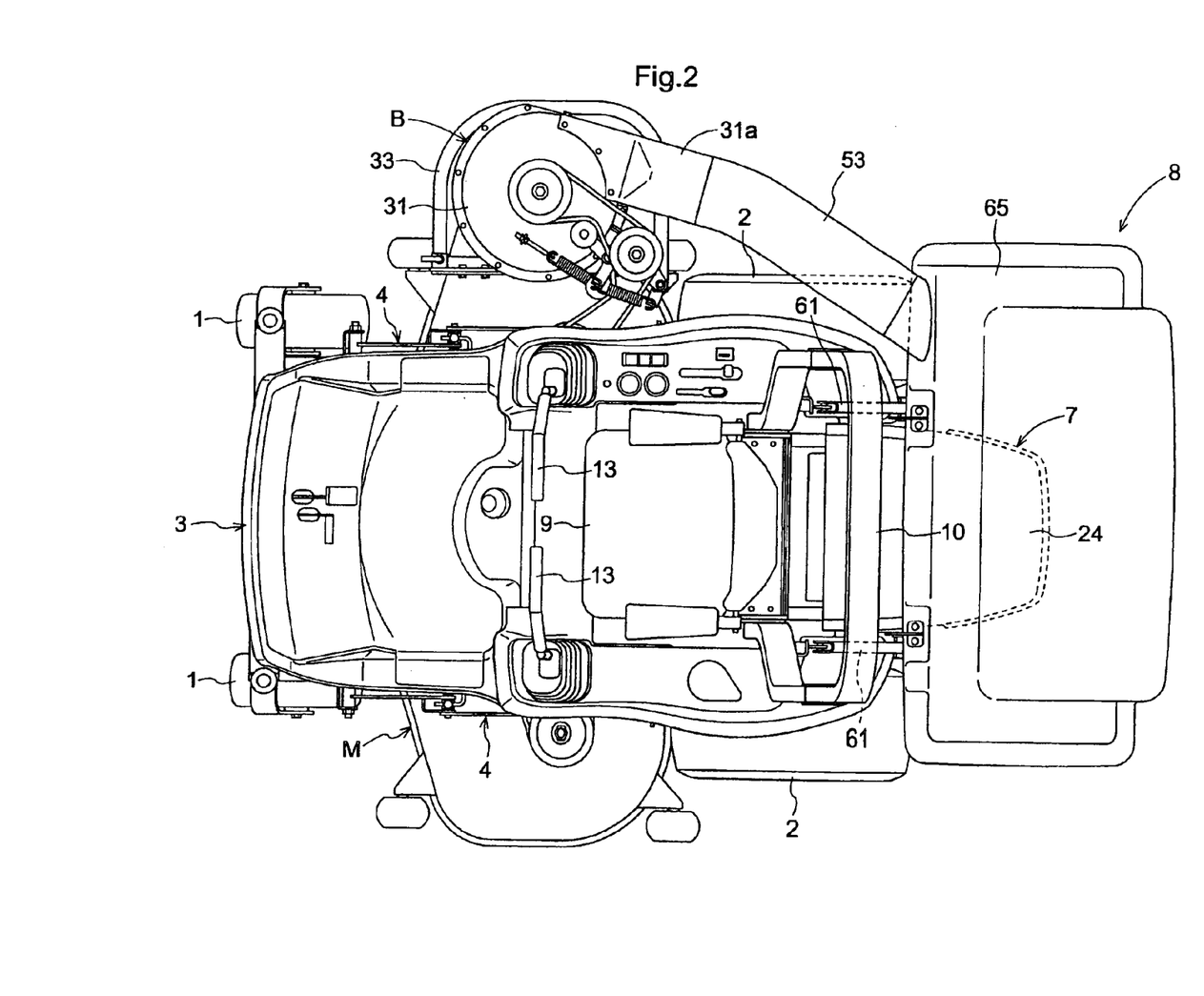
FIG. 2 is a plan view of the lawn mower.

FIG. 1 and FIG. 2 show a lawn mower relating to the present invention in side elevation and in plan view, respectively. The lawn mower comprises a running vehicle body 3 having a right and left pair of caster-type front wheels 1 and a right and left pair of rear drive wheels 2. A mower unit M is suspended from the underside of the running vehicle body 3 between the front and rear wheels through a right and left pair of four-point linkage mechanisms 4 each having a front link 4a, a rear link 4b and a lower connecting link 4c. The linkage mechanisms are vertically movable by a hydraulic cylinder 5 thereby to move the mower unit M vertically in a generally parallel movement. A motor section 7 housing an engine 6 projects rearwardly of the rear wheels 2. A grass collecting apparatus 8 for collecting grass clippings is mounted across the motor section 7. A driver's seat 9 is disposed forwardly of the motor section 7, and a gate-shaped rollover protective structure (ROPS) 10 is mounted between the driver's seat 9 and the motor section 7.

A detailed description of the vehicle construction is omitted here. Output from the engine 6 is inputted to a counter casing 11 and divided into a propelling line and a working line. Power in the propelling line is inputted to an unillustrated right and left pair of hydraulically operable stepless hydrostatic transmissions (HSTs) provided at opposite sides of the counter casing 11. Power output in varied speeds is transmitted from the respective HSTs to the right and left rear wheels 2 individually through reduction cases 12. The stepless hydrostatic transmissions for driving the right and left rear wheels 2 are shiftable by a pair of right and left propelling levers 13 individually which are provided at opposite sides of the driver's seat 9 to be rockable back and forth, thereby to steplessly change forward and backward speeds of the right and left rear wheels 2 independently. The right and left propelling levers 13 are operable to selectively establish a forward or rearward straight running state, a turning state with the right and rear wheels 2 driven at different speeds, a pivot turn with one of the rear wheels 2 standing still, and a spin turn with the right and left rear wheels 2 driven in opposite directions. The branched drive power for the working line is outputted forwardly from a PTO shaft 14 projecting from a lower front portion of the counter casing 11 to be transmitted to the mower unit M.

Figure 3:
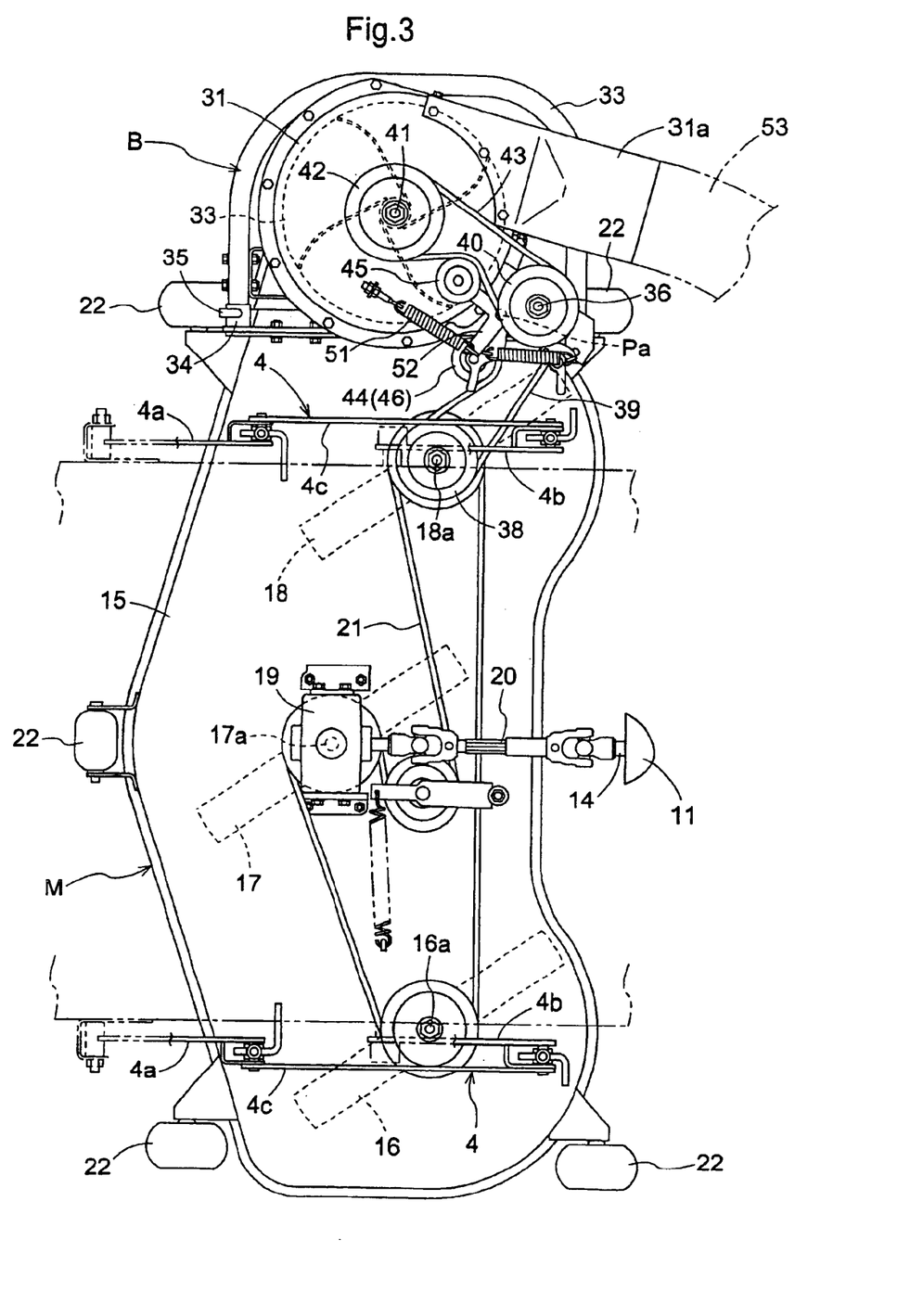
FIG. 3 is a plan view of a mower unit.
Figure 4:
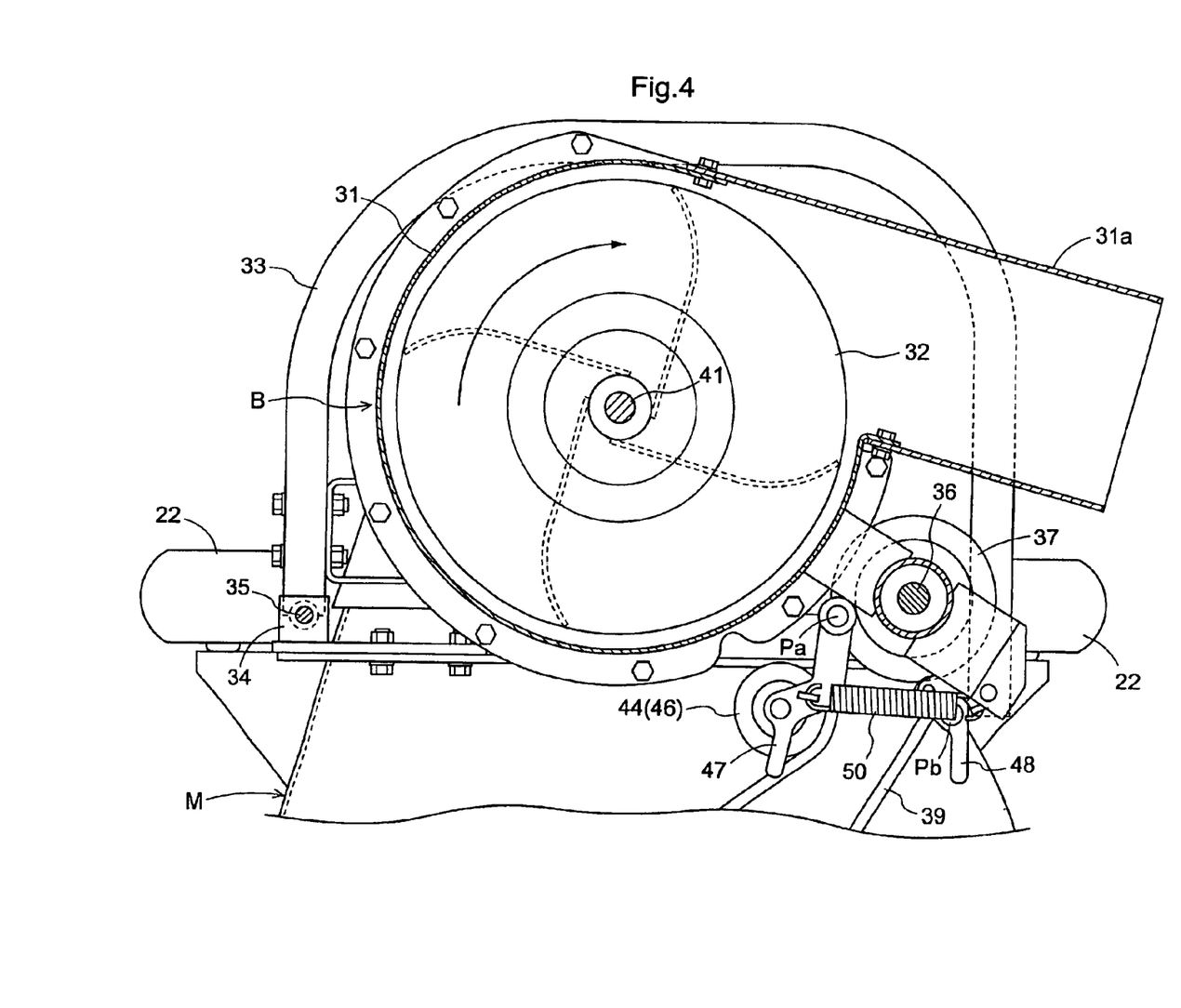
FIG. 4 is a plan view of a blower unit in cross section.
Figure 5:
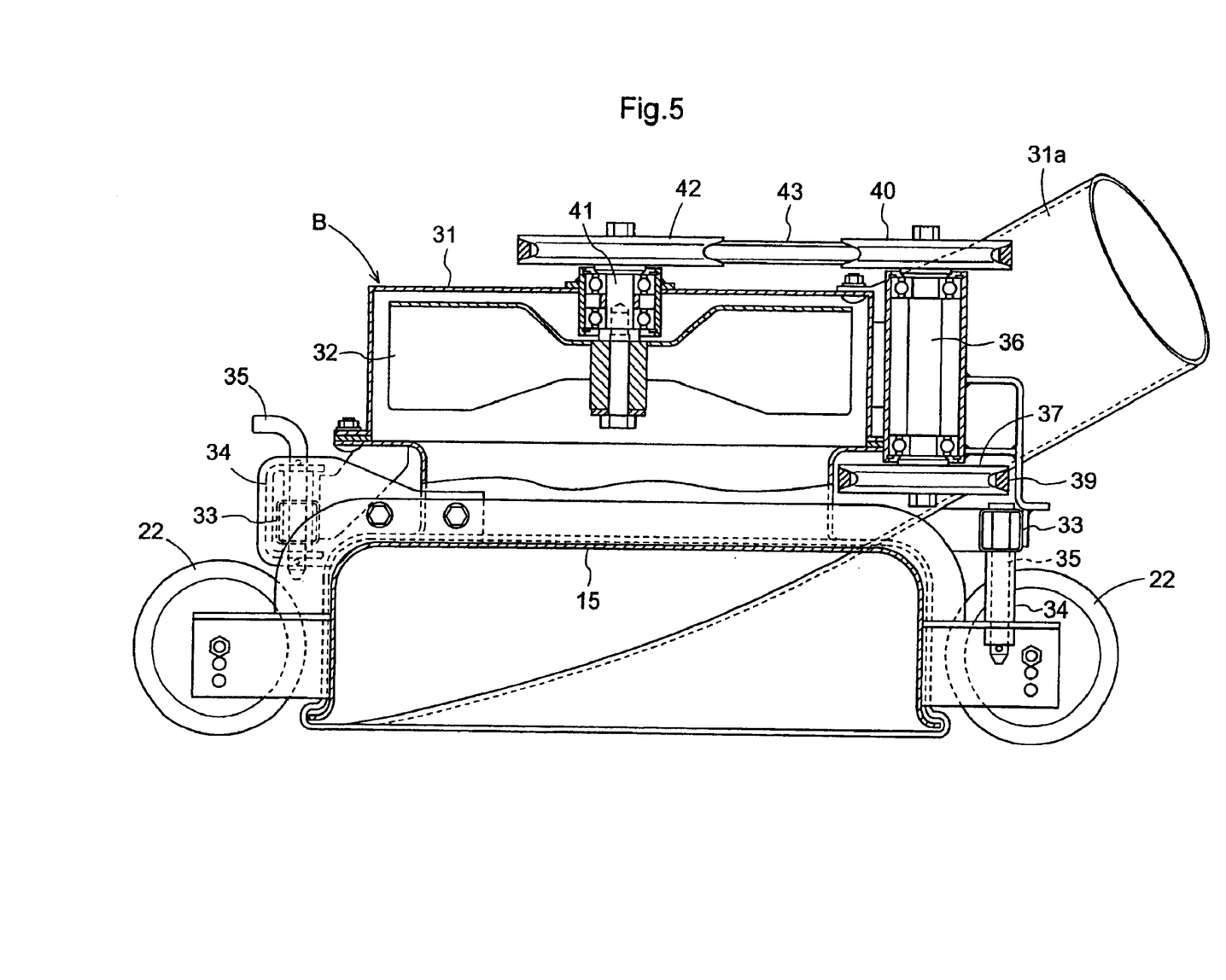
FIG. 5 is a side view of the blower unit in vertical section.
Figure 6:
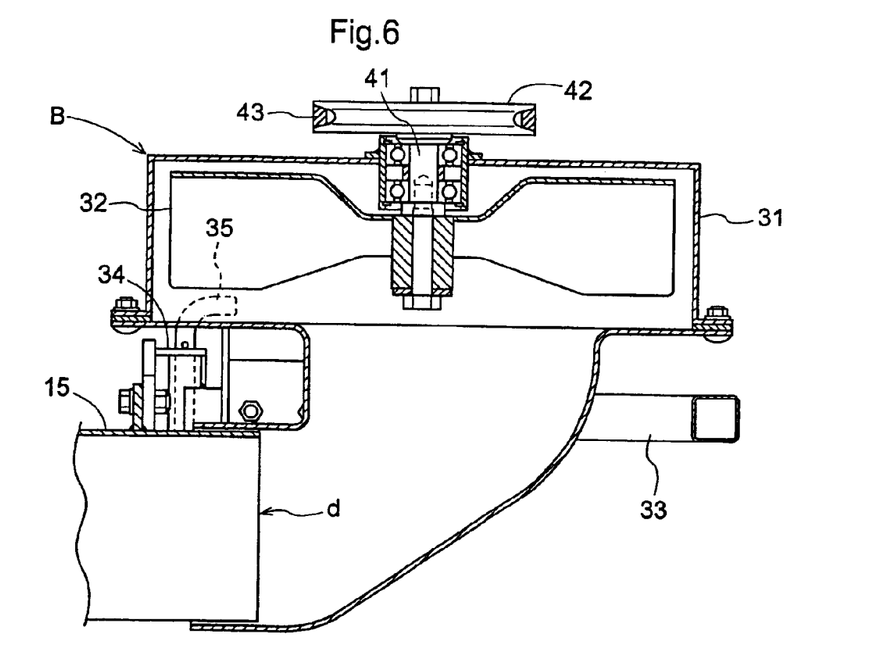
FIG. 6 is a rear view of the blower unit in vertical section.
Figure 7:
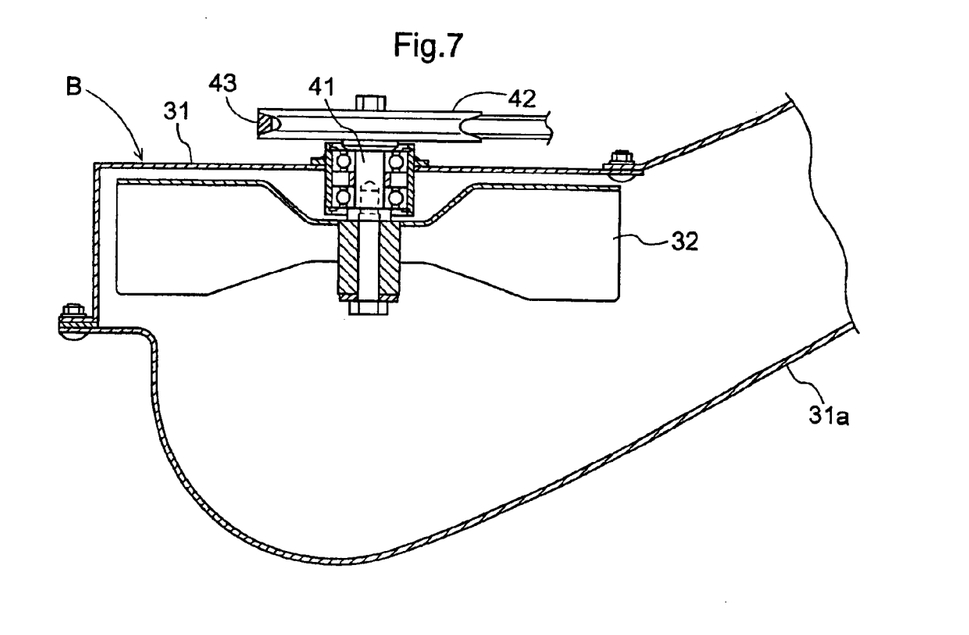
FIG. 7 is a side view of a principal portion of the blower unit in vertical section.

As illustrated in FIG. 3, the mower unit M includes a mower deck 15 opening downward and including three bar blades 16, 17 and 18 mounted therein to be rotatable about vertical axes. These blades are arranged in juxtaposition and shaft-supported by the mower deck. The mower deck 15 is constructed as a flat deck with an upper wall having a uniform height over the entire deck. A discharge section forming a discharge outlet "d" is provided at a right end portion of the deck.

The working drive power taken from the PTO shaft 14 is transmitted to a bevel gear casing 19 mounted on a central top surface of the mower deck 15 through a flexible and extendible and contractible shaft transmission mechanism 20. The rotary power converted to rotation about a vertical axis in the bevel gear casing 19 is transmitted to a rotary shaft 17a of the central bar blade 17. The rotary shaft 17a and rotary shafts 16a and 18a of the right and left bar blades 16 and 18 are interlocked with each other through a belt 21 wound thereon. All of the bar blades 16, 17 and 18 are rotated in the same direction (clockwise as viewed from above) so that front halves of loci of rotation of the bar blades 16, 17 and 18 are directed toward the discharge outlet "d". Further, freely rotatable wheels (anti-scalp rollers) 22 are provided around the mower deck 15 for riding obstacles.

A blower unit B is attached to the right end portion of the mower deck 15 of the mower unit M, as described hereinafter, to be driven for forcing grass clippings discharged from the discharge outlet "d" toward the grass collecting apparatus 8 at the rear of the vehicle body.

As shown in FIGS. 3 through 7, the blower unit B includes a blower housing 31 connected to the discharge outlet "d" of the mower deck 15, and an impeller 32 supported by an upper wall of the blower housing 31 to be rotatable about a vertical axis. The blower housing 31 is connected and fixed to a support frame 33 U-shaped in plan view and mounted on the right end portion of the mower deck 15. The support frame 33 is connected at front and rear ends thereof to connecting elements 34 fixed to the deck through connecting pins 35 to be detachable by removing the connecting pins 35 to separate the blower unit B from the discharge outlet "d" for the purpose of maintenance. The support frame 33 connecting and supporting the blower housing 31 also serves as a guard frame surrounding the blower housing 31.

An intermediate vertical shaft 36 is mounted at the rear of the support frame 33. A belt 39 is wound in tension between a pulley 37 mounted on a lower end portion of the intermediate vertical shaft 36 and a pulley 38 mounted on an upper end portion of the blade drive shaft 18a of the right-end bar blade 18, while a belt 43 is wound in tension between a pulley 40 mounted on an upper end portion of the intermediate vertical shaft 36 and a pulley 42 of an impeller drive shaft 41 protruding from a top surface of the blower housing 31. Thus, the blower unit B is driven by the power taken from the blade driving line.

The belt 39 for operatively interconnecting the blade drive shaft 18a and the intermediate vertical shaft 36 is provided in a position higher than the blade driving belt 21. As shown in FIG. 1, the lower connecting link 4c of the linkage mechanism 4 is inclined to extend upwardly and rearwardly to be connected to the mower deck 15 so that the pulley 38 and the belt 39 are accommodated, free from interference, in a vertically enlarged space defined between a rear portion of the lower connecting link 4c of the right-side linkage mechanism 4 and the upper surface of the deck.

Figures 8A, 8B:
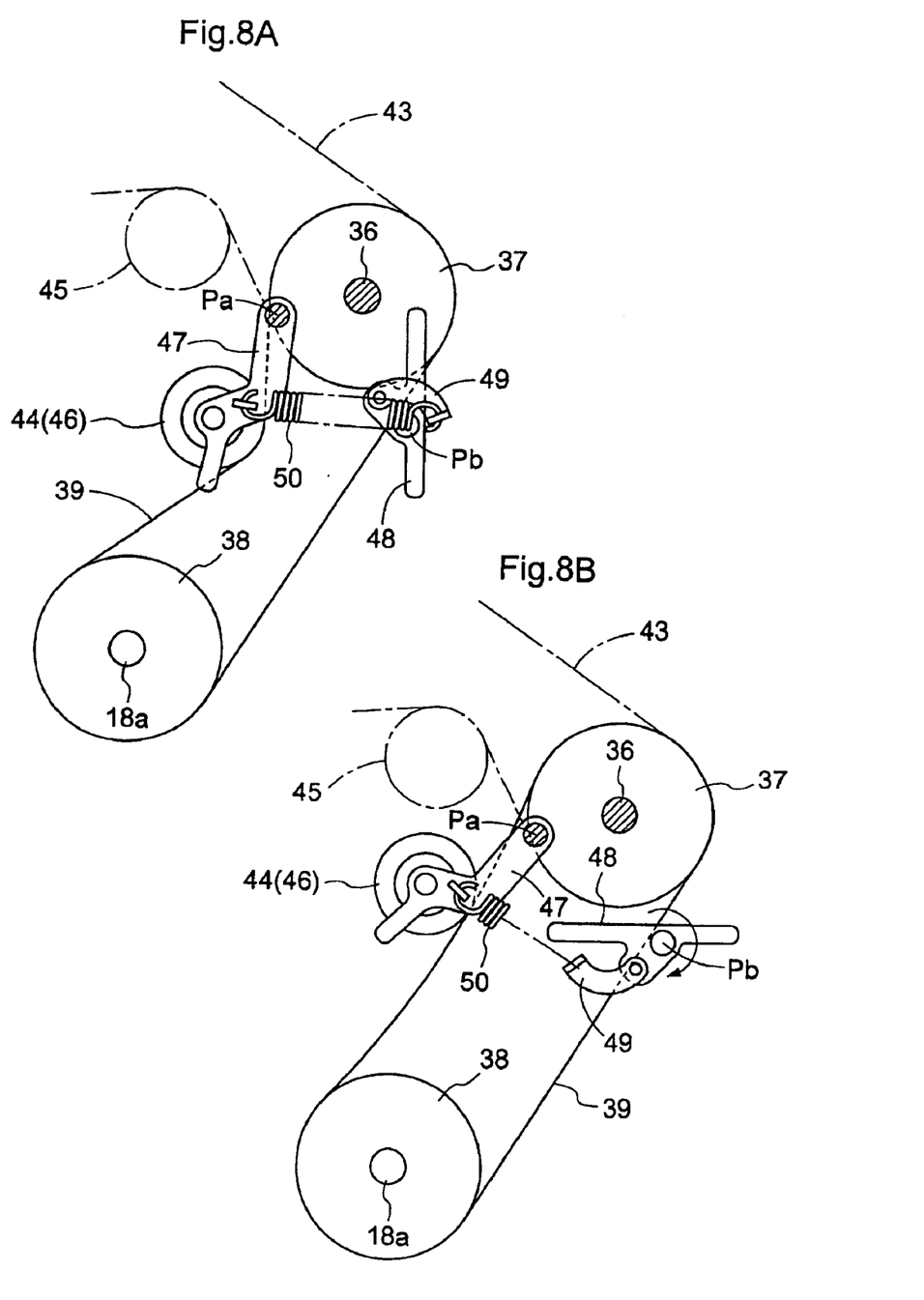
FIG. 8A and FIG. 8B are plan views of a tension clutch.

The belt 29 wound around and operatively interconnecting the blade drive shaft 18a and the intermediate vertical shaft 36 and the belt 43 wound around and operatively interconnecting the intermediate vertical shaft 36 and the impeller drive shaft 41 are pressed tight by tension rollers 44 and 45, respectively. The tension roller 44 acting on the belt 39 acts also as a tension clutch 46 for breaking and establishing power transmission from the blade drive shaft 18a to the intermediate vertical shaft 36. More particularly, as shown in FIGS. 8A and 8B, the tension roller 44 is carried by a tension arm 47 swingable about a pivotal shaft Pa disposed on the blower unit. The tension arm 47 is operatively connected to a switching control lever 48 mounted on the blower unit to be selectively swingable about a control shaft Pb disposed on the blower unit through a curved link 49 and a spring 50. The switching control lever 48 is pivotable beyond a dead point to be selectively maintained between an engaging position for pressing the tension roller 44 against the belt 39 by a tensile force of the spring 50 and a disengaging position for moving the tension roller 44 sufficiently away from the belt 39 to relieve the tension. The tension roller 45 is also carried by a tension arm 52 supported to be swingable about the pivotal shaft Pa and pivotably urged in a fixed direction by a spring 51, thereby to constantly maintain the belt 43 under tension.

As described above, the blower driving mechanism including the intermediate vertical shaft 36, the tension arms 47 and 52, the belt 43, the switching control lever 48 and the like is incorporated in the blower unit B as an integral part thereof. In order to detach the blower unit from the mower deck 15, the belt 39 is removed from the pulley 38 of the blade drive shaft 18a to remove the connecting pins 35 with the tension clutch 46 being maintained in the disengaging position. On the other hand, a reversed process is carried out to attach the blower unit to the mower deck 15, and then the belt 39 is wound around the pulley 38 to switch and maintain the tension clutch 46 in the engaging position.

The intermediate vertical shaft 36 is mounted upright and positioned in a corner formed inwardly of the vehicle body and enclosed by a discharge sleeve 31a projecting rearwardly from an outer peripheral position of the blower housing 31 and a circular outer periphery of the blower housing 31. Thus, the blower drive mechanism is accommodated in the interior of the support frame 33 compactly in both the fore-and-aft and sideways directions.

A cylindrical duct 53 is detachably inserted in and connected to the discharge sleeve 31a of the blower housing 31 in the blower unit B installed and driven as set forth above for guiding and supplying the grass clippings forcibly discharged by the impeller 32 to the grass collecting apparatus 8 mounted on the rear of the vehicle body.

The grass collecting apparatus 8 is adapted to collect the grass clippings transported through the duct 53 in two grass catching bags 60 mounted on opposite sides of the motor section 7. The construction thereof will be described hereinafter.

Grass catcher frames 61 made of pipes are connected through pins between lateral post portions of the rollover protective structure 10 and engine mounting frames 23 below the motor section 7. A cross frame 61a extends between upper portions of the grass catcher frames 61, and four bag supporting arms 62 extend rearward from the cross frame 61a. A right and left pair of bag connecting sections 63 are distributed to opposite sides of the motor section 7, each defined by the two bag supporting arms 62. The duct 53 is detachably connected at a rear end thereof to the grass collecting apparatus at a right-side position thereof, while a guide cover 65 with an entire area thereof opening downward is mounted on the grass catcher frames 61 to be vertically pivotable about a pivotal point "c" between an open position and a closed position.

Figure 9:
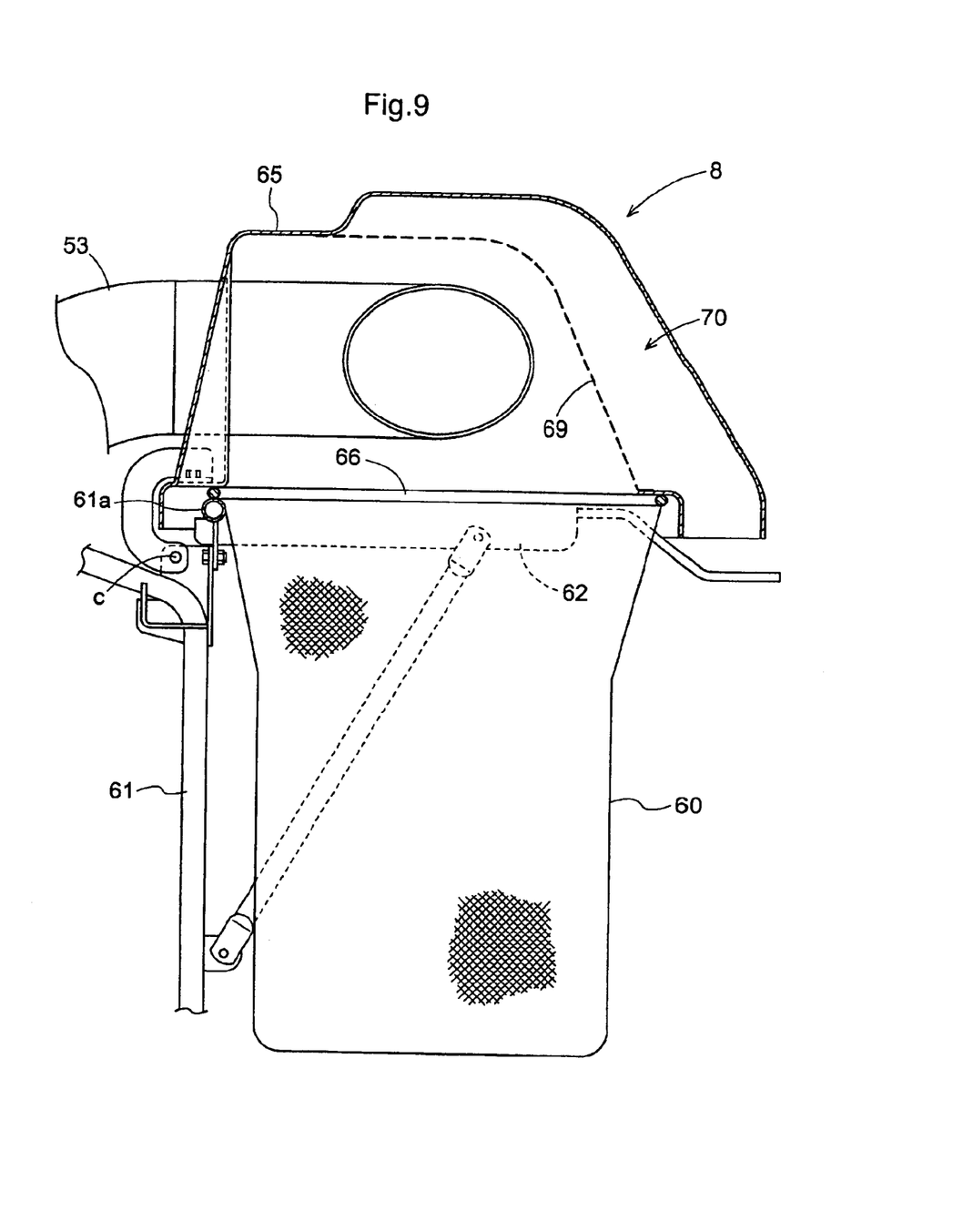
FIG. 9 is a side view of a grass collecting apparatus in vertical section.
Figure 10:
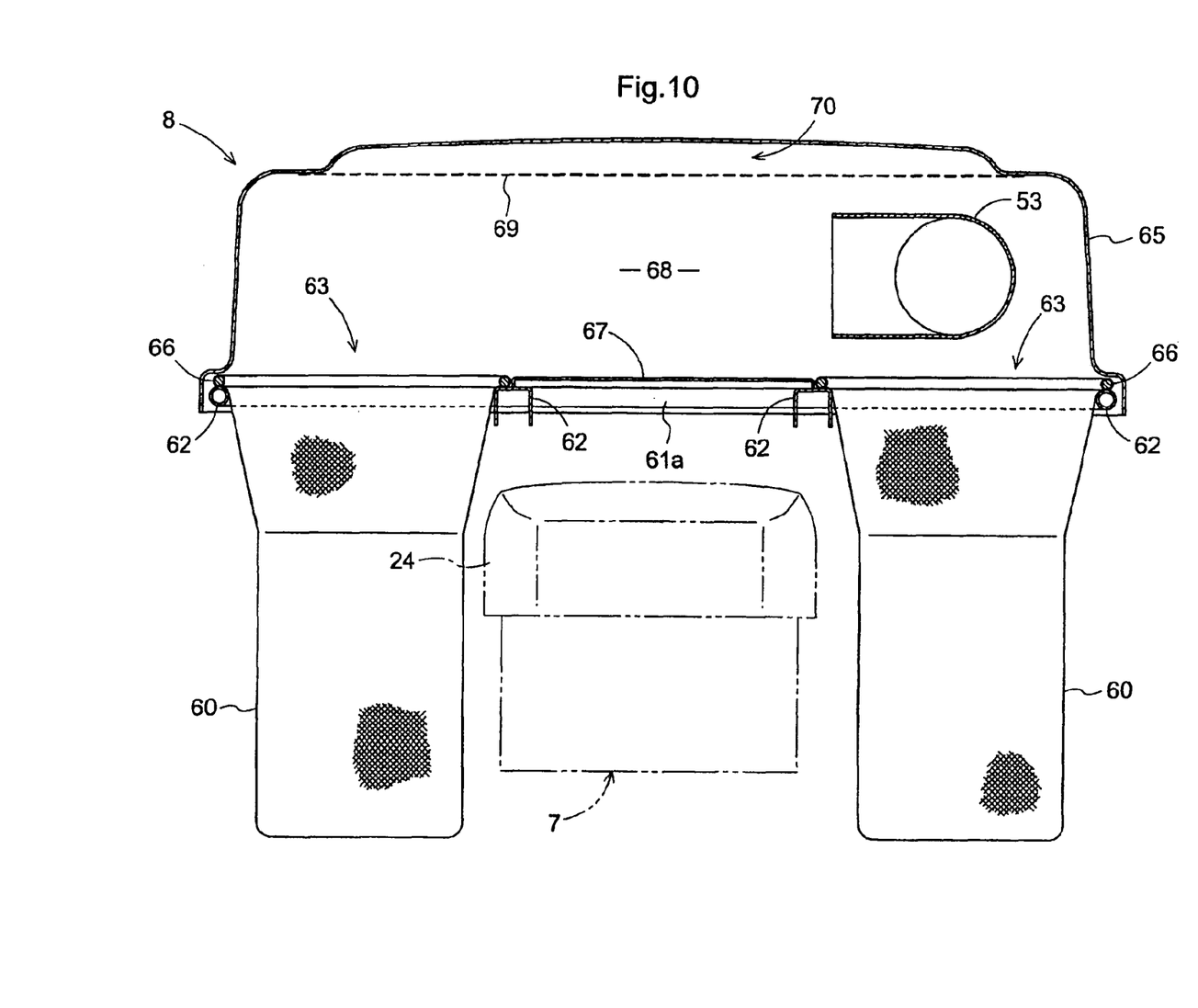
FIG. 10 is a rear view of the grass collecting apparatus in vertical section.
Figure 11:
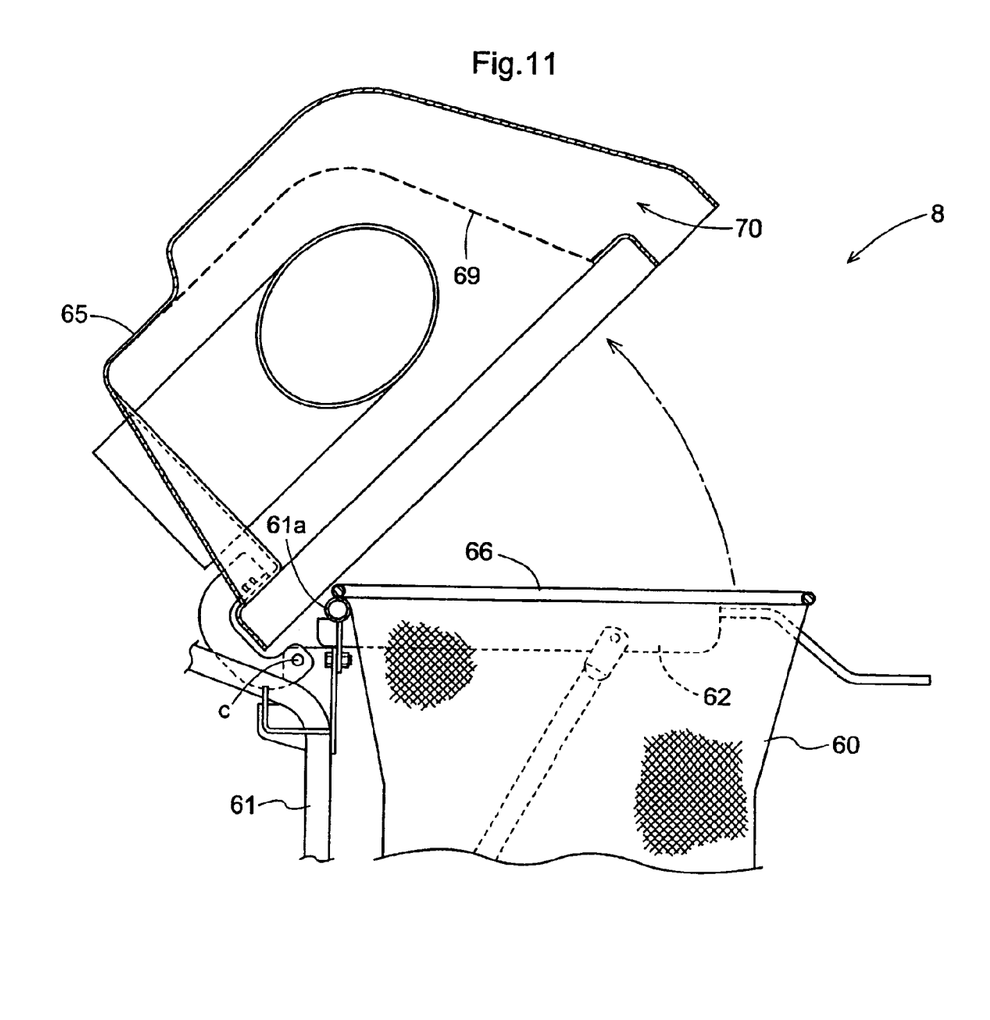
FIG. 11 is a side view showing part of the grass collecting apparatus in vertical section with a guide cover being opened.
Figure 12:
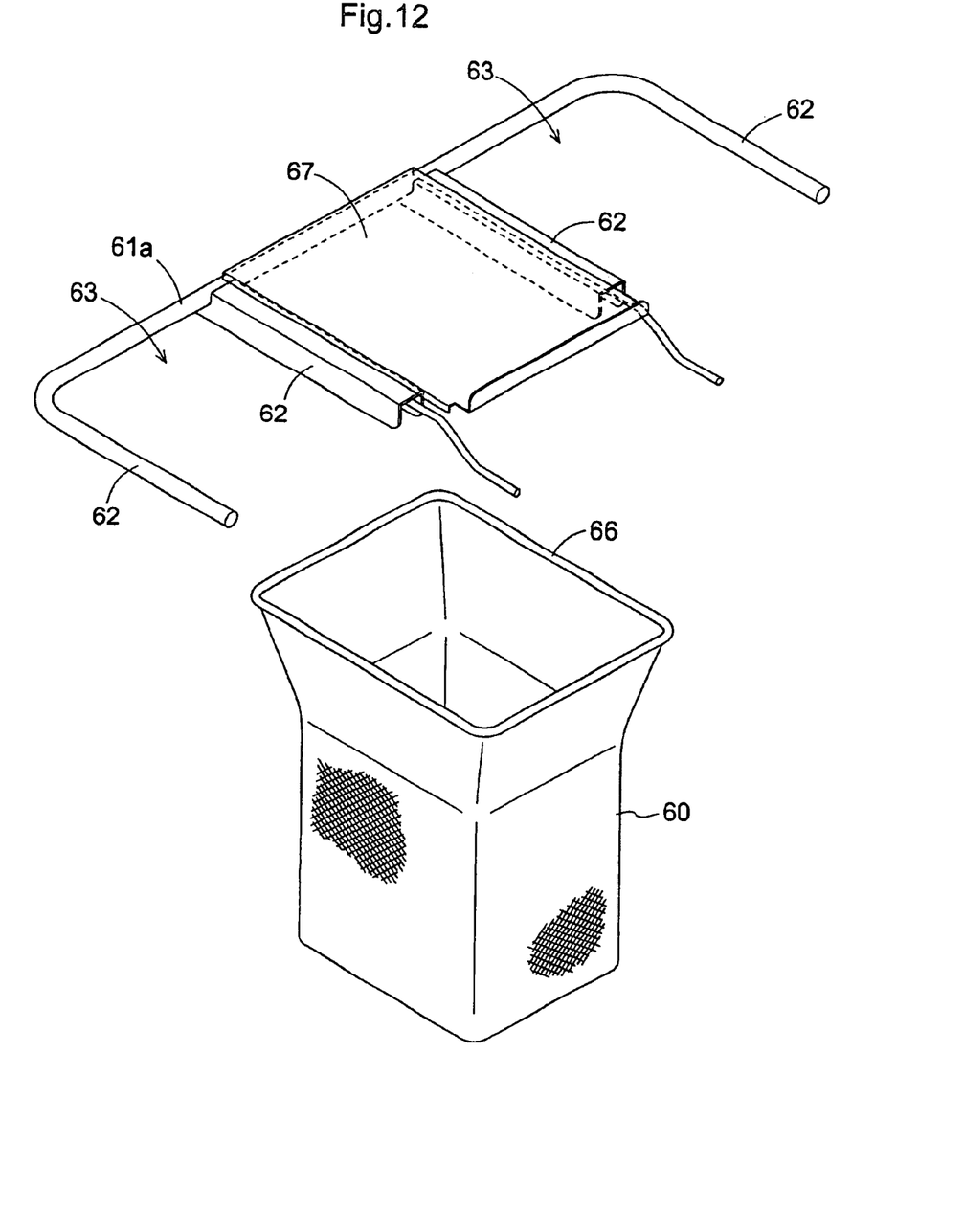
FIG. 12 is an exploded perspective view of the grass collecting apparatus.

Each of the grass catching bags 60 is a rectangular bag made of sewn cloth of high air permeability. A core frame 66 made of a metal bar is sewn to an upper opening edge of the bag to maintain the opening edge of the bag in a rectangular shape. The opening edge maintained in its shape by the core frame 66 is placed on top surfaces of the two bag supporting arms 62 in each bag connecting section 63 and supported by a lower edge portion of the closed guide cover 65, thereby to prevent lifting of the grass catching bag 60.

The two sets of bag supporting arms 62 constituting the right and left bag connecting sections 63 are provided in a position slightly higher than an engine hood 24 in the motor section 7. A bottom plate 67 extends between the two inner bag supporting arms 62 so as to overlap the engine hood 24. The bottom plate 67 forms a tunnel passage 68 within the guide cover 65 when the latter is lowered, to interconnect upper spaces in the right and left bag connecting sections 63. The grass clippings fed into the right side of the guide cover 65 through the duct 52 are guided by the guide cover 65 to the right and left grass catching bags 60. Air flows entraining the grass clippings and blown into the guide cover 65 are directed to an air discharge passage 70 through a mesh-like air discharge outlet 69 formed on an inner surface of a rear portion of the guide cover 65, thereby to be discharged rearwardly and downwardly.

Figure 13:
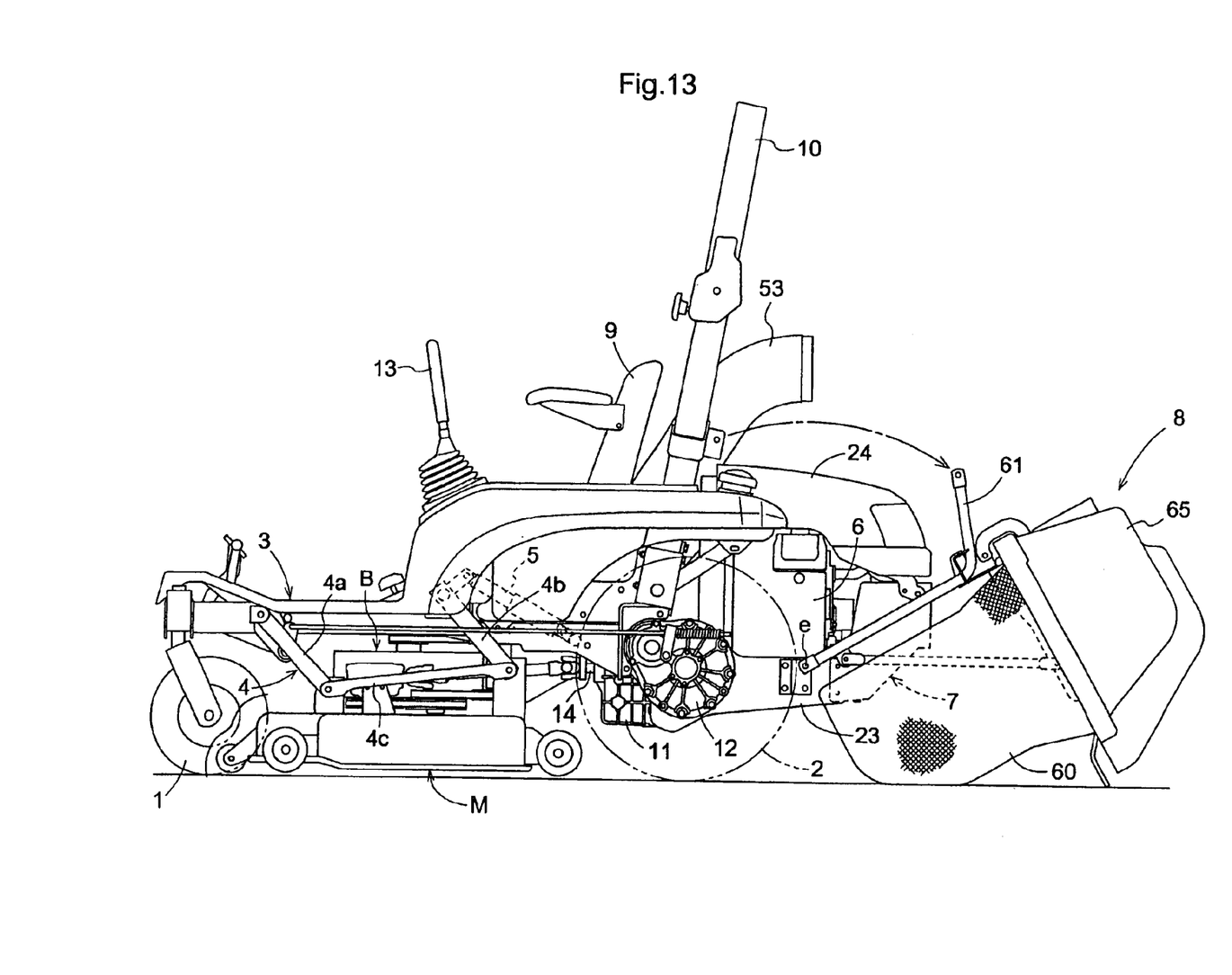
FIG. 13 is a side elevation of the lawn mower with the grass collecting apparatus being opened.

For inspection and maintenance of the motor section 7, as illustrated in FIG. 13, the pin-connection between the grass catcher frames 61 and the rollover protective structure frame 10 is released, and the entire grass catcher frames 61 is swung rearwardly about a pin connecting point "e" connecting the frames to the engine mounting frames 23, thereby to produce an open space around the motor section 7.

What is claimed is:

1. A lawn mower comprising:
   a mower deck supported by a vehicle body;
   a blade drive shaft with a blade rotatably mounted inside the mower deck;
   a grass clippings discharging section provided in a side end region of the mower deck;
   a blower unit including a cylindrical blower housing connected to the grass clippings discharging section, a vertical drive shaft having a shaft portion with vanes attached thereto inside the blower housing and a shaft portion extending upward through the blower housing, and a discharging sleeve projecting rearwardly along an outer tangent line of the blower housing;
   a grass collecting apparatus mounted rearwardly of the vehicle body;
   a duct for allowing the discharging sleeve to communicate with the grass collecting apparatus;
   a belt-type blade driving mechanism mounted above a top wall of the mower deck for driving the blade drive shaft; and
   a belt-type blower driving mechanism for driving the vertical drive shaft of the blower unit by utilizing power transmitted from the belt-type blade driving mechanism, the blower driving mechanism including an intermediate vertical shaft disposed rearwardly of the blower housing, and a belt transmission unit for transmitting power from the blade drive shaft to the vertical drive shaft through the intermediate vertical shaft.

2. A lawn mower as claimed in claim 1, wherein the intermediate vertical shaft is mounted in a corner area defined by an outer peripheral wall of the blower housing and the discharging sleeve.

3. A lawn mower as claimed in claim 2, wherein the belt transmission unit includes belt pulleys mounted on the blade drive shaft and the intermediate vertical shaft, a first belt wound around the pulleys, and a fist tension clutch switchable between a disengaging position for breaking the power transmission ability of the first belt and an engaging position for maintaining the power transmission ability of the first belt.

4. A lawn mower as claimed in claim 3, wherein the belt transmission unit includes belt pulleys mounted on the vertical drive shaft and the intermediate vertical shaft, a second belt wound around the pulleys, and a second tension clutch switchable between a disengaging position for breaking the power transmission ability of the second belt and an engaging position for maintaining the power transmission ability of the second belt.

5. A lawn mower as claimed in claim 4, wherein the tension pulley of the first tension clutch and the tension pulley of the second tension clutch are displaceable about a common pivotal axis.

* * * * *

UNITED STATES PATENT AND TRADEMARK OFFICE
CERTIFICATE OF CORRECTION

PATENT NO. : 6,854,249 B1
DATED : February 15, 2005
INVENTOR(S) : Samejima et al.

It is certified that error appears in the above-identified patent and that said Letters Patent is hereby corrected as shown below:

Column 7,
Line 2, "fist tension clutch" should read -- first tension clutch --.

Signed and Sealed this

Twenty-third Day of August, 2005

JON W. DUDAS
*Director of the United States Patent and Trademark Office*